United States Patent [19]

Sugiyama

[11] Patent Number: 5,128,405
[45] Date of Patent: Jul. 7, 1992

[54] POLYOXYMETHYLENE COMPOSITIONS CONTAINING AMINE POLYMER HAVING PENDANT —NH₂ FUNCTIONAL GROUPS

[75] Inventor: Noriyuki Sugiyama, Shizuoka, Japan

[73] Assignee: Polyplastics Co., Ltd., Osaka, Japan

[21] Appl. No.: 631,732

[22] Filed: Dec. 20, 1990

[30] Foreign Application Priority Data

Dec. 28, 1989 [JP] Japan .................. 1-342384

[51] Int. Cl.⁵ .................. C08L 51/06; C08K 5/13
[52] U.S. Cl. .................. 524/538; 524/291; 524/400; 524/593
[58] Field of Search .............. 524/593, 291, 400, 538

[56] References Cited

U.S. PATENT DOCUMENTS

| | | | |
|---|---|---|---|
| 3,903,197 | 9/1975 | Ishida et al. | 524/291 |
| 4,837,400 | 6/1989 | Walter et al. | 524/593 |
| 4,843,115 | 6/1989 | Auerbach et al. | 524/100 |

FOREIGN PATENT DOCUMENTS

| | | |
|---|---|---|
| 0270279 | 6/1988 | European Pat. Off. |
| 0289142 | 11/1988 | European Pat. Off. |
| 0333660 | 9/1989 | European Pat. Off. |
| 3051446 | 8/1986 | Japan . |
| 1009883 | 11/1965 | United Kingdom . |

*Primary Examiner*—Paul R. Michl
*Assistant Examiner*—Tae H. Yoon
*Attorney, Agent, or Firm*—Nixon & Vanderhye

[57] ABSTRACT

Polyoxymethylene molding compositions include a polyoxymethylene base resin and contain, based upon the weight of the polyoxymethylene base resin, between 0.01 to 5% by weight of a hindered phenolic antioxidant, and between 0.01 to 5% by weight of an amine polymer having a molecular weight of at least 1000 and comprised essentially of structural units of the following formula (1):

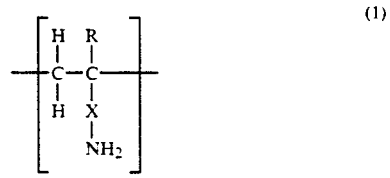

wherein R represent a hydrogen atom, an alkyl group, a phenyl group, an alkyl-substituted phenyl group, an NH₂ group directly bonded to the carbon atom, or —X—NH₂— where X represents an alkylene group, a carbonyl group, a carboxyalkylene group, an alkyleneoxycarbonylalkyl group, a phenylene group, an alkyl-substituted phenylene group, an amido group or an alkyleneamido group.

11 Claims, No Drawings

POLYOXYMETHYLENE COMPOSITIONS CONTAINING AMINE POLYMER HAVING PENDANT —NH$_2$ FUNCTIONAL GROUPS

FIELD OF INVENTION

The present invention relates to polyoxymethylene molding compositions which exhibit improved mold release properties and improved thermal stability during molding (thereby minimizing the release of free formaldehyde to the ambient environment).

BACKGROUND AND SUMMARY OF THE INVENTION

Polyoxymethylene is a well known engineering resin that is produced by polymerizing formaldehyde or trioxane (which is a cyclic oligomer of formaldehyde) or by copolymerizing trioxane with a comonomer, such as a cyclic ether or cyclic formal. The terminal end groups of the polyoxymethylene chain are typically stabilized (e.g., via hydrolysis) to inhibit depolymerization of the polyoxymethylene chain. Antioxidants and other thermal stabilizers have been blended with polyoxymethylene molding compositions so as to further improve their thermal stability characteristics.

Sterically hindered phenol compounds as well as sterically hindered amine compounds are well known antioxidants that have been incorporated into polyoxymethylene molding compositions in the past. In addition, other thermal stabilizers that have been blended with polyoxymethylene resins include polyamides, urea derivatives, amidine compounds, alkali metal hydroxides, alkaline earth metal hydroxides, and organic and inorganic acid salts.

However, polyoxymethylene resin compositions which include such known antioxidants and/or thermal stabilizers may still undergo some depolymerization during molding (i.e., due to the elevated temperatures that are employed during the molding cycle) and thereby emit free formaldehyde as a by-product of such depolymerization activity. Release of free formaldehyde into the ambient workplace is quite noxious and therefore should be avoided. However, as mentioned above, even with known antioxidants and/or stabilizers, some release of free formaldehyde is inevitable and therefore has typically been tolerated in the past with suitable protective measures being taken.

Another disadvantage associated with conventional antioxidants and/or thermal stabilizers is that deposits (e.g., powdery or tarry residues) typically form on the mold walls, particularly after molding has progressed continuously for a significant length of time. These mold deposits can, and often do, build up over time to such an extent that the appearance of the resulting molded part is adversely affected.

It is towards providing solutions to the above-noted problems that the present invention is directed. Broadly, the present invention includes the incorporation of a specified amine polymer (to be described in greater detail below) and an antioxidant into a polyoxymethylene base resin.

Preferred embodiments of this invention will include (based on the weight of the polyoxymethylene base resin) between 0.01 to 5% by weight of a hindered phenolic antioxidant, and between 0.01 to 5% by weight of an amine polymer having a molecular weight of at least 1000 and comprised essentially of structural units of the following formula (1):

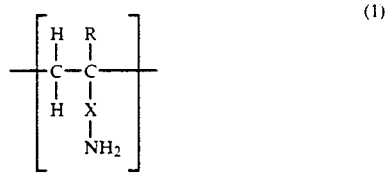

wherein R represents a hydrogen atom, an alkyl group, a phenyl group, an alkyl-substituted phenyl group, an NH$_2$ group directly bonded to the carbon atom, or —X—NH$_2$, wherein X represents an alkylene group, a carbonyl group, a carboxyalkylene group, an alkyleneoxycarbonylalkyl group, a phenylene group, an alkyl-substituted phenylene group, an amido group or an alkyleneamido group.

The polyoxymethylene molding compositions according to the present invention will exhibit improved stability during molding and thereby significantly reduce (if not essentially eliminate) chain depolymerization and the resulting release of free formaldehyde into the ambient environment. In addition, the polyoxymethylene molding compositions of the present invention exhibit improved mold release properties so as to minimize the deleterious effects of mold deposits associated with conventional polyoxymethylene molding compositions.

Further aspects and advantages of the present invention will become more clear from the following detailed description of the preferred exemplary embodiments thereof which follow.

DETAILED DESCRIPTION OF THE PREFERRED EXEMPLARY EMBODIMENTS

The amine polymer that is necessarily employed in the compositions of the present invention includes any of those polymers which are comprised essentially of the structural units of the above formula (1) and having a molecular weight of at least 1000. Preferred are homopolymers, crosslinked polymers or copolymers having a molecular weight of at least 1000 and comprising allylamine, acrylamide, acrylic hydrazide, methacrylic hydrazide, an aminoalkyl acylate, an aminoalkyl methacrylate or a vinylalkylamine, or a copolymer thereof with ethylene, propylene, butylene, butadiene, styrene, acrylonitrile, an acrylic ester or a methacrylic ester. These amine polymers may be used alone or in combinations of two or more of the same.

As noted above, the molecular weight of the amine polymers used in the compositions of this invention is at least 1000. Preferably, however the molecular weight of the amine polymer is at least 5000, and still preferably between 10,000 to 100,000. When the molecular weight is less than 1000, the amine polymer is not adequately compatible with the polyoxymethylene compositions (thereby resulting in surface "oozing"), so that the intended effect of the present application cannot be obtained.

Particularly preferred amine polymers include homopolymers, crosslinked polymers and copolymers comprised mainly of allylamine or acrylamide structural units and having a molecular weight of at least 1000.

When the amine polymer is used in combination with the hindered phenolic antioxidant, it exhibits an inhibiting effect upon the decomposition (depolymerization) of the polyoxymethylene. This inhibited depolymerization thereby contributes to significantly reduced free formaldehyde emissions. However, the presence of the amine polymer also serves as a free formaldehyde scavenger so that any formaldehyde that may be present in the composition, or released due to any polyoxymethylene decomposition that may occur, is chemically bound by means of the functionalized side chain NH₂ moieties present in the amine polymers employed according to the present invention. Any free formaldehyde that may be formed by polyoxymethylene decomposition is thus "captured" by the amine polymer so that the formation and emission of decomposition formaldehyde gas is considerably inhibited. Mold deposits also rarely form during molding since the amine polymers themselves rarely sublime or decompose during the molding operation.

The hindered phenolic antioxidants used in the present invention include 2,2'-methylene bis(4-methyl-6-t-butylphenol), 1,6-hexanediol bis[3-(3,5-di-t-butyl-4-hydroxyphenyl)propionate], pentaerythritol tetrakis[3-(3,5-di-t-butyl-4-hydroxyphenyl)propionate], triethylene glycol bis[3-(3-t-butyl-5-methyl-4-hydroxyphenyl) propionate], 1,3,5-trimethyl-2,4,6-tris(3,5-di-t-butyl-4-hydroxybenzyl)benzene, n-octadecyl 3-(4'-hydroxy-3',5'-di-t-butylphenyl)-propionate, 4,4'-methylenebis(2,6-di-t-butylphenol), 4,4'-butylidenebis(6-t-butyl-3-methylphenol), 2,2'-thiodiethylbis[3-(3,5-di-t-butyl-4-hydroxyphenyl)-propionate], di-stearyl 3,5-di-t-butyl-4-hydroxybenzyl-phosphonate, 2-t-butyl-6-(3-t-butyl-5-methyl-2-hydroxybenzyl)-4-methylphenyl acrylate and N,N'-hexamethylenebis(3,5-di-t-butyl-4-hydroxyhydrocinnamamide). They may be used either alone or in combinations of two or more of the same. Among them, particularly preferred are 1,6-hexanediol-bis[3-(3,5-di-t-butyl-4-hydroxyphenyl)propionate], pentaerythritol tetrakis[3-(3,5-di-t-butyl-4-hydroxyphenyl)propionate], triethylene glycol bis[3-(3-t-butyl-5-methyl-4-hydroxyphenyl) propionate]and N,N'-hexamethylene bis(3,5-di-t-butyl-4-hydroxyhydrocinnamide).

The amount of the hindered phenolic antioxidant used in the present invention is between 0.01 to 5% by weight, preferably between 0.1 to 3% by weight, based on the weight of the polyoxymethylene. The amount of the amine polymer, on the other hand, is between 0.01 to 5% by weight, preferably between 0.01 to 1% by weight based on the weight of the polyoxymethylene. When the amounts of these additives are less than those specified above, little (if any) beneficial effects can be achieved. On the other hand, when they are present in excessive amounts, the heat stabilizing effect reaches a saturation (maximum) level so that further addition results in discoloration of the compositions.

The polyoxymethylene base resins into which the above-described additives are to be incorporated are polymeric compounds comprised mainly of oxymethylene (—CH₂O—) units. They may be polyoxymethylene homopolymers, copolymers, terpolymers and block copolymers comprised mainly of oxymethylene units and a relatively lesser amount of other constitutive units. The molecule of the polyoxymethylene resin may be linear, as well as branched or crosslinked. The degree of polymerization thereof is not particularly limited, provided the polyoxymethylene resin is normally solid.

Particularly preferred homopolymers may be prepared using the techniques in U.S. Pat. No. 2,768,994 to MacDonald, whereas the preferred polyoxymethylene copolymers may be prepared using the techniques disclosed in U.S. Pat. No. 3,027,352 to Walling (each patent being incorporated expressly hereinto by reference).

The compositions of the present invention may additionally contain one or more compounds selected from among nitrogenous compounds (other than the amine polymers described above), an alkali or alkaline earth metal hydroxide, an inorganic acid salt, and a metallic compound such as a carboxylate or an alkoxide.

The nitrogenous compounds preferably include polyamides such as homopolymeric and copolymeric polyamides, e.g. nylon 12, nylon 6,10 and nylon 6,66,610, substituted polyamides having a methylol group or the like, nylon salts, polyesteramides synthesized from a combination of caprolactone and caprolactam; as well as polyaminotriazoles, heat condensation products synthesized from dicarboxylic dihydrazide and urea by heating, nitrogen-containing polycondensates synthesized from urea and a diamine, heat condensation product of urea synthesized by heating urea, uracils, cyanoguanidines, dicyandiamide, guanamine (2,4-diamino-sym-triazine), melamine (2,4,6-triamino-sym-traizine), N-butylmelamine, N-phenylmelamine, N,N-diphenylmelamine, N,N-diallylmelamine, N,N',N"'-triphenylmelamine, N,N'N'-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dihydroxy-6-amino-sym-triazine (ammelide), 2-hydroxy-4,6-diamino-sym-triazine (ammeline) and N,N,N',N'-tetracyano-ethylbenzoguanamine.

The metallic compounds preferably include hydroxides of sodium, potassium, magnesium, calcium and barium, carbonates, phosphates, silicates, borates, oxalates, malonates, succinates, adipates, and salts of higher ($C_{10}$ to $C_{32}$) fatty acids such as stearic acid and substituted higher fatty acids having a substituent such as a hydroxyl group. They may further include basic compounds having at least tone tertiary nitrogen atom and a metal carboxylate group in one molecule such as sodium N-methyliminodiacetate, trisodium nitrilotriacetate, tetrasodium ethylenediaminetetraacetate, tetrapotassium ethylenediaminetetraacetate, pentasodium diethylenetriaminepentaacetate, pentapotassium diethylenetriaminepentaacetate, hexasodium triethylenetetraminehexaacetate and tetrasodim ethylenedioxybis (ethylamine)-N,N,N',N'-tetraacetate.

The compositions of the present invention may contain one or more known additives such as lubricants, nucleating agents, release agents, antistatic agents, surfactants, organic polymeric materials, and inorganic or organic fibrous, powdery or platy fillers in order to impart desired properties thereto depending on the intended end use application for the composition and/or its desired physical properties.

The process for producing the compositions of the present invention is not particularly limited. In this regard, the compositions of the present invention can easily be produced with known apparatus using known processing techniques for the production of ordinary resin compositions. For example, the compositions can be produced by (i) mixing the components together followed by kneading and extruding the mixture with an extruder to form pellets which are thereafter shaped into a molding, (ii) producing two or more kinds of pellets having different compositions from one another, mixing predetermined amounts of the pellets together and subjecting the pellet mixture to a molding operation to obtain a molded article having an intended composition of (iii) directly introducing one or more of the necessary and optional components into a molding machine. It is also preferred that a part of the resin components be finely pulverized and then mixed with other components in order to obtain a homogeneous mixture.

The resin compositions of the present invention can be produced using any well known plastics fabrication technique, such as extrusion molding, injection molding, compression molding, vacuum molding, blow molding, and foam molding processes.

The following non-limiting Examples will further illustrate the present invention.

EXAMPLES

The following evaluation methods were used in the Examples:

(1) Moldability

A sample of the polyoxymethylene composition was continuously molded (for about 24 hrs.) with an injection molding machine under predetermined conditions.

B: slight staining
C: moderate staining
D: relatively severe staining
E: extremely severe staining

(2) Weight loss upon heating

The weight loss caused when 5 grams of the sample was heated at 235° C. in air for 45 min. was determined by measuring the final sample weight after heating and then subtracting the final sample weight from the initial sample weight.

EXAMPLES 1 to 7

Hindered phenolic antioxidants and amine polymers listed in Table 1 were added to a polyoxymethylene copolymer (Duracon TM, a product of Polyplastics Co., Ltd.) in ratios as specified in Table 1. The components were mixed and extruded with an extruder to form a pelletized composition. The pellets were then subjected to the above-described tests, with the results being given in Table 1.

COMPARATIVE EXAMPLES 1 to 5

Pellets were produced in the same manner as that of Examples 1 to 7 except that the amine compound was replaced with 0.3% by weight of a conventional stabilizer additive as listed in Table 1. The samples were subjected to the same tests as the samples of Examples 1 to 7 with the results being provided in Table 1.

TABLE 1

| | | Composition | | | | | Quality | | |
| --- | --- | --- | --- | --- | --- | --- | --- | --- | --- |
| | | hindered phenol antioxidant (wt. %) | amine polymer *3 (wt. %) | | others (wt. %) | | moldability | | weight loss upon heating (ppm/min) |
| | | | | | | | smell of formaldehyde | amount of deposit in the mold | |
| Ex. No. | 1 | a *1 (0.3) | polyallylamine 1 | (0.1) | — | | A | A | 65 |
| | 2 | a  " | " | (0.3) | — | | A | A | 60 |
| | 3 | a  " | " | (0.5) | — | | A | A | 60 |
| | 4 | a (0.5) | " | (0.3) | — | | A | A | 60 |
| | 5 | a (0.3) | polyallylamine 2 | (0.3) | — | | A | A | 60 |
| | 6 | a (0.3) | acrylamine/styrene copolymer (80/20) | (0.3) | — | | A | A | 60 |
| | 7 | b *2 (0.3) | polyallylamine 1 | (0.3) | — | | A | A | 60 |
| Comp. Ex. No. | 1 | a (0.3) | — | | Ca stearate | (0.3) | D | B | 145 |
| | 2 | a (0.3) | — | | melamine | (0.3) | B | C | 80 |
| | 3 | a (0.3) | — | | polyamide | (0.3) | C | C | 100 |
| | 4 | a (0.3) | — | | cyanoguanidine | (0.3) | B | E | 300 |
| | 5 | a (0.3) | — | | " | (0.3) | B | E | 340 |

*1 a: triethylene glycol bis[3-(3-t-butyl-5-methyl-4-hydroxyphenyl)propionate]
*2 b: pentaerythritol tetrakis[3-(3,5-di-t-butyl-4-hydroxyphenyl)propionate]
*3 c: molecular weight of polyallylamine 1: 10000, molecular weight of polyallylamine 2: 80000.

The following tests were conducted
(i) Formaldehyde odor during molding:

Twenty (20) immediately as-produced moldings (about 30 mm × about 5 mm × about 1.5 mm) were placed in a zippered polyethylene bag (size: 10 cm × 14 cm) and sealed. After a predetermined period of time, the bag was opened and the odor emitted from the bag was qualitatively classified into the following four ranks:

A: no irritating odor
B: only a faint formaldehyde odor
C: relatively strong formaldehyde odor
D: extremely strong formaldehyde odor (ii) Quantity of mold deposits:

The extent of mold staining after the continuous molding operation was classified into the following five qualitative ranks:

A: no staining

It will be apparent from the above description and Examples that the thermal stability of the polyoxymethylene compositions according to the present invention is remarkably improved. The resin compositions are therefore preferred from the viewpoint of the reduced formaldehyde emissions and mold deposits that ensue.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A polyoxymethylene composition comprising a blend of a polyoxymethylene base resin and, based upon the weight of the polyoxymethylene base resin, between 0.01 to 5% by weight of a hindered phenolic antioxidant, and an effective free formaldehyde scavenging amount between 0.01 to 5% by weight of an amine polymer having a molecular weight of at least 1000 and comprised essentially of structural units of the following formula (1):

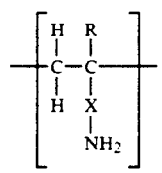

wherein R represent a hydrogen atom, an alkyl group, a phenyl group, an alkyl-substituted phenyl group, an $NH_2$ group directly bonded to the carbon atom, or —X—$NH_2$— where X represents an alkylene group, a carbonyl group, a carboxyalkylene group, an alkyleneoxycarbonylalkyl group, a phenylene group, an alkyl-substituted phenylene group, an amido group or an alkyleneamido group, wherein the pendant —$NH_2$ functional group in the amine polymer of formula (1) chemically binds with free formaldehyde present in the composition, whereby depolymerization of said polyoxymethylene base resin is inhibited.

2. A polyoxymethylene composition according to claim 1, wherein the hindered phenolic antioxidant is selected from one or more of 1,6-hexanediol-bis[3-(3, 5-di-t-butyl-4-hydroxyphenyl)-propionate], pentaerythritoltetrakis[3-(3,5-di-t-butyl-4-hydroxyphenyl)-propionate, triethylene glycol bis[3-t-butyl-5-methyl-4-hydroxyphenyl)-propionate], and N,N'-hexamethylenebis(3,5-di-t-butyl-4-hydroxyhydrocinnamide).

3. A polyoxymethylene composition according to claim 1 or claim 2, wherein the hindered phenolic antioxidant is present in an amount between 0.1 to 3% by weight, based on the weight of the polyoxymethylene base resin.

4. A polyoxymethylene composition according to any one of claims 1 or 2, wherein the amine polymer is at least one polymer selected from the group consisting of alkylamine homopolymers, crosslinked polymers and copolymers.

5. A polyoxymethylene composition according to claim 1 or 2, wherein the amine polymer is at least one polymer selected from the group consisting of acrylamide homopolymers, crosslinked polymers and copolymers.

6. A polyoxymethylene composition according to claim 1, wherein the molecular weight of the amine polymer used is at least 5000.

7. A polyoxymethylene composition according to claim 6, wherein the molecular weight of the amine polymer used is in the range 10,0000 to 100,000.

8. A polyoxymethylene composition according to claim 1, wherein the amine polymer is present in an amount between 0.01 to 1% by weight, based on the weight of the polyoxymethylene base resin.

9. A polyoxymethylene composition according to claim 1 or 2, which further contains one or more compounds selected from among a nitrogeneous compound other than the said amine polymer, an alkali or alkaline earth metal hydroxide, an inorganic acid salt, and a metallic compound such as a carboxylate or alkoxide.

10. A molded article which consists essentially of the polyoxymethylene composition according to claim 1.

11. A polyoxymethylene composition according to claim 1 or 2, wherein the amine polymer is at least one polymer selected from the group consisting of allylamine homopolymers, crosslinked polymers and copolymers.

* * * * *

UNITED STATES PATENT AND TRADEMARK OFFICE
CERTIFICATE OF CORRECTION

PATENT NO. : 5,128,405
DATED : July 7, 1992
INVENTOR(S) : Noriyuki SUGIYAMA

It is certified that error appears in the above-identified patent and that said Letters Patent is hereby corrected as shown below:

Column 4, line 46, delete "tone" and insert --one--.

Column 4, line 53, delete "tetrasodim" and insert --tetrasodium--.

Signed and Sealed this

Seventeenth Day of August, 1993

Attest:

BRUCE LEHMAN

Attesting Officer     Commissioner of Patents and Trademarks